May 1, 1956  F. M. REID ET AL  2,743,939
TANDEM AXLE WHEEL SUSPENSION FOR AUTOMATIC VEHICLES
Filed Feb. 13, 1953  3 Sheets-Sheet 1

INVENTORS,
Frederick M. Reid,
Hans Locker.
BY
Harness, Dickey & Pierce
ATTORNEYS.

May 1, 1956 F. M. REID ET AL 2,743,939
TANDEM AXLE WHEEL SUSPENSION FOR AUTOMATIC VEHICLES
Filed Feb. 13, 1953 3 Sheets-Sheet 2
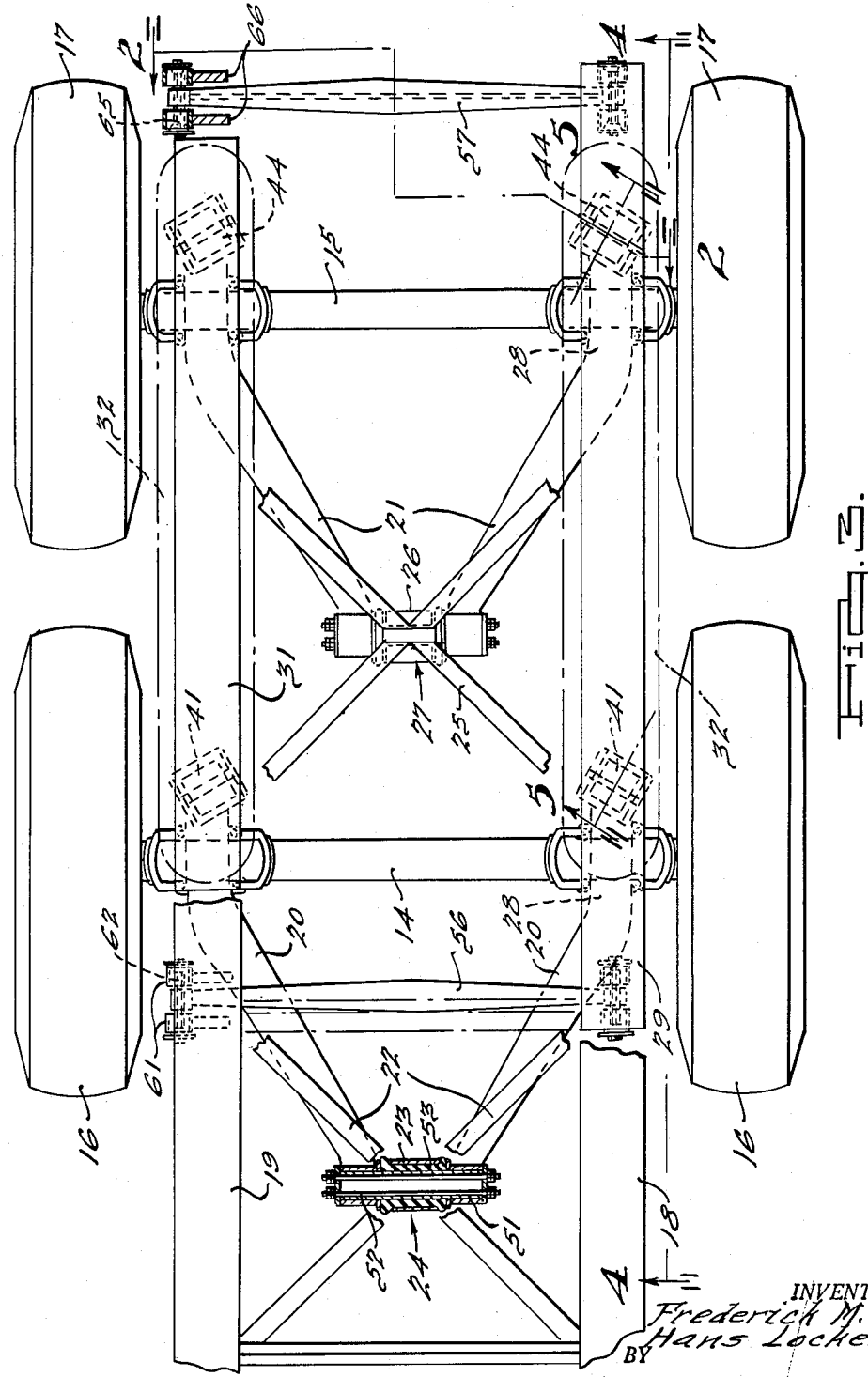
INVENTORS.
Frederick M. Reid.
Hans Locher.
BY
Harness, Dickey & Pierce
ATTORNEYS.

May 1, 1956  F. M. REID ET AL  2,743,939
TANDEM AXLE WHEEL SUSPENSION FOR AUTOMATIC VEHICLES
Filed Feb. 13, 1953  3 Sheets-Sheet 3
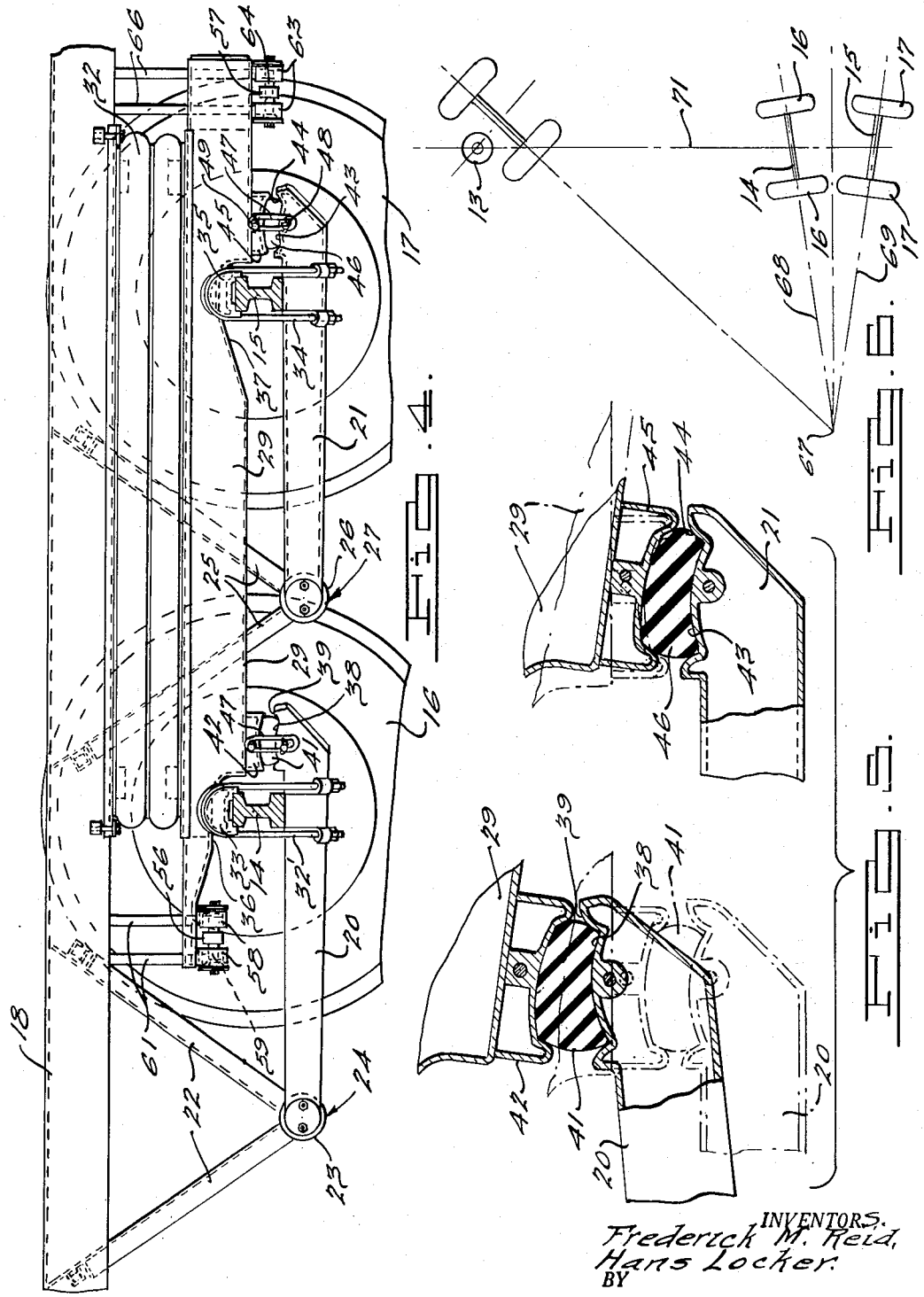
INVENTORS.
Frederick M. Reid,
Hans Locker.
BY
Harness, Dickey & Pierce
ATTORNEYS.

United States Patent Office 2,743,939
Patented May 1, 1956

2,743,939

TANDEM AXLE WHEEL SUSPENSION FOR AUTOMOTIVE VEHICLES

Frederick M. Reid, Grosse Pointe, and Hans Locker, Utica, Mich., assignors to Fruehauf Trailer Company, Detroit, Mich., a corporation of Michigan Application February 13, 1953, Serial No. 336,774

14 Claims. (Cl. 280—104.5)

This invention relates to suspensions for trailer wheels, and more particularly to wheel suspensions for trailers having tandem axles.

It is an object of this invention to provide an improved wheel suspension for trailers having tandem axles, which permits turning of the trailer without wearing or scuffing of the wheels as the vehicle travels on a turning radius.

It is another object to provide an improved trailer suspension of the above nature, in which the tandem axles are permitted to assume radial positions with respect to the center of rotation, so that the wheels on each axle may rotate without side slipping motion and subsequent tire wear.

It is a further object to provide an improved trailer suspension having the above characteristics, which distributes the forces due to road shocks or jars between the tandem axles, whereby the maximum loads on the individual parts are minimized and smoother riding qualities are incorporated in the trailer.

It is also an object to provide a trailer spring suspension of the above nature, which incorporates resilient elements between the road axles and the main frame of the trailer, these elements being arranged in a novel manner whereby a snubbing and shock absorbing action takes place when road shocks are encountered, this action also performing the function of distributing the momentary increases in load between the tandem axles.

Other objects, features, and advantages of the present invention will become apparent from the subsequent description, taken in conjunction with the accompanying drawings.

In the drawings:

Figure 3 is a top plan view of the improved wheel suspension showing the configuration of the torque arms and the resilient connection between the torque arms and the main frame;

Figure 4 is a side elevational view of the wheel suspension in cross-section taken along the line 4—4 of Figure 3 and showing the relative disposition of the tandem axles and equalizing beams as well as the bellows type springs;

Figure 5 is a fragmentary cross-sectional view taken along the line 5—5 of Figure 3 showing the relative disposition of the equalizing beam, torque arms and pillow blocks in various positions; and Figure 6 is a diagrammatic view with exaggerated dimensions showing the position of the tandem axles during turning of the trailer.

Figure 1:
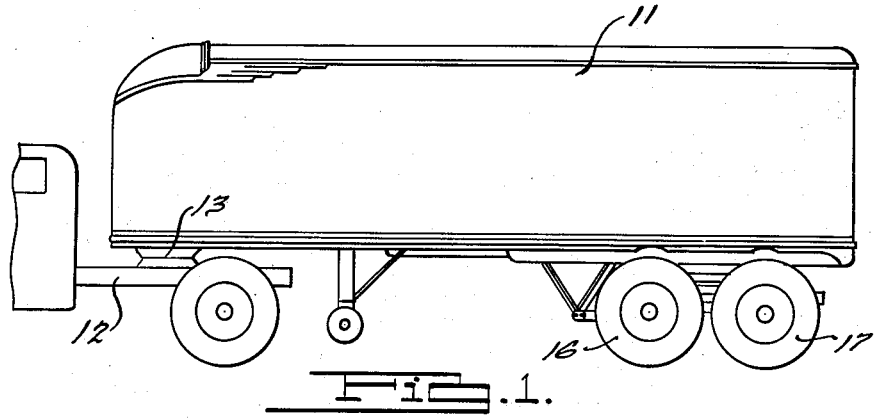
Figure 1 is a side elevational view of a semi-trailer provided with tandem axles, and incorporating the novel and improved wheel suspension of this invention.

The improved wheel suspension of this invention is shown in the illustrated embodiment as part of a semi-trailer 11 shown in Figure 1, the trailer being towed by a tractor 12 through a conventional fifth wheel assembly 13. It will be understood however that the suspension could also be applied to other types of trailers within the scope of the invention. The trailer 11 is shown as having tandem axles, a forward axle 14 and a rear axle 15, the axles having a plurality of wheels 16 and 17 respectively. The trailer has side frame members 18 and 19 shown as box members in the illustrated embodiment, and a plurality of braces are secured at their upper ends to the side frame members and extend downwardly and inwardly to provide two spaced supports for two sets of torque arms 20 and 21 to which the axles 14 and 15 are secured. In particular, a set of four forward braces 22 is provided, disposed forwardly of the forward axle 14 and converging at their lower ends which are secured to an outer sleeve member 23 of the forward support for torque arms 20, this support being generally indicated at 24. Likewise, a set of four braces 25 are provided between the forward axle 14 and rear axle 15, these braces also converging downwardly from the main frame and being secured to the outer sleeve 26 of the forward support for rear torque arm 21, this support being generally indicated at 27. The constructional details of resilient supports 24 and 27 are described in detail below.

The pairs of torque arms 20 and 21 extend rearwardly and outwardly from their forward supports, in a plane substantially parallel to that of main side frame members 18 and 19 as shown in Figures 3 and 4. The rear ends of the torque arms are disposed substantially below members 18 and 19, and the rear portions 28 of the torque arms are substantially parallel with these members. A pair of equalizing beams 29 and 31 are disposed below side frames 18 and 19 respectively, beam 29 being somewhat longer than beam 31, and both beams extending approximately between axles 14 and 15. As described in detail below, the equalizing beams serve to distribute the load between the axles, as well as performing other functions, and the beams are substantially aligned with the trailer side frames and are disposed between the side frames and the axles. A pair of elongated bellows springs 32 of a known type are disposed between equalizing beams 29 and 31 and their respective trailer side frames 18 and 19, these springs serving to cushion the trailer frame in a known manner and to provide a floating support therefor.

The equalizing beams are supported by the rear ends of torque arms 20 and 21, and road axles 14 and 15 are secured to intermediate portions of the torque arms, so that the trailer load is transmitted in a manner described below from the side frames 18 and 19 through both ends of the sets of torque arms to the road axles. In particular, the road axle 14 is secured to the pair of torque arms 20 by means of shackle bolts 32' and adapters 33, and rear axle 15 is likewise secured to the pair of torque arms 21 by means of shackle bolts 34 and adapters 35. It will be observed that the position of axles 14 and 15 is substantially rearwardly of the central portions of torque arms 20 and 21. The forward portions of equalizing beams 29 and 31 are provided with clearance recesses 36 to allow relative vertical movement between axle 14 and the equalizing beams, while the rear ends of the equalizing beams have clearance recesses 37 which serve a like purpose with respect to rear axle 15.

The rear ends of the torque arms 20 and 21 are provided with upwardly facing recesses for receiving resilient pillow blocks which are disposed between the torque arms and the equalizing beams. In particular, each torque arm 20 is provided with a recess 38 formed by a continuous rim or bead 39, this recess facing upwardly and receiving a pillow block 41 of resilient material such as rubber. Equalizing beams 29 and 31 are provided with downwardly facing recessed and beaded retaining portions 42 which receive the upper portions of pillow blocks 41. Likewise, the rear ends of rear torque arms 21 are provided with upwardly facing recesses 43 formed with continuous rims 44, and equalizing beams 28 and 29 have downwardly facing retaining portions 45 opposite recesses 43, pillow blocks 46 being disposed between retaining portions 43 and 45.

It will be noted, especially from an examination of Figure 3, that the retaining portions for the pillow blocks are preferably rectangular in shape, the axes of these retaining portions being inclined with respect to the longitudinal axes of the equalizing beams. In order to prevent substantial separation of the rear ends of torque arms 20 and 21 from equalizing beams 29 and 31 in a vertical direction, chain loops 47 or similar members are provided adjacent the pillow block retaining portions, these chain loops loosely engaging pins 48 and 49 secured to the torque arms and the equalizing beams respectively. The arrangement is such that limited lateral movement between the ends of the torque arms and the equalizing beams is permitted by the slack which is normally present in chain loops 47. It will be noted that pillow blocks 41 and 46 are shown as positioned respectively under the forward and rear portions of bellows type springs 32, and that the longitudinal distance between the forward and rear pillow blocks may be substantially the same as that between the forward and rear axles.

Resilient connections 24 and 27 for the pairs of torque arms 20 and 21 respectively are substantially identical, and Figure 3 shows the construction of forward support 24. As stated previously, the lower ends of braces 22 are secured to outer sleeve 23 of support 24, and torque arms 20 are independently pivoted at their forward ends to an inner sleeve 51 coaxial with sleeve 23. In particular, sleeve 51 is substantially longer than sleeve 23 and extends outwardly therefrom on either side, the torque arms 20 being rotatably mounted thereon and held by means of bolts and end retainers 52. Disposed in the space between the sleeves is a resilient bushing 53 such as rubber, the bushing being under compression but being sufficiently yieldable to permit relative angular movement of the sleeves. In other words, if axle 14 is urged to a position out of its normal right angles relationship with the longitudinal axis of the trailer, resilient support 24 for the torque arms will allow such movement to occur to a limited extent. Resilient support 27 is constructed in a manner similar to that of support 24, and therefore will permit movement of rear axle 15 in either direction from a position normal to the trailer axis.

Figure 2:
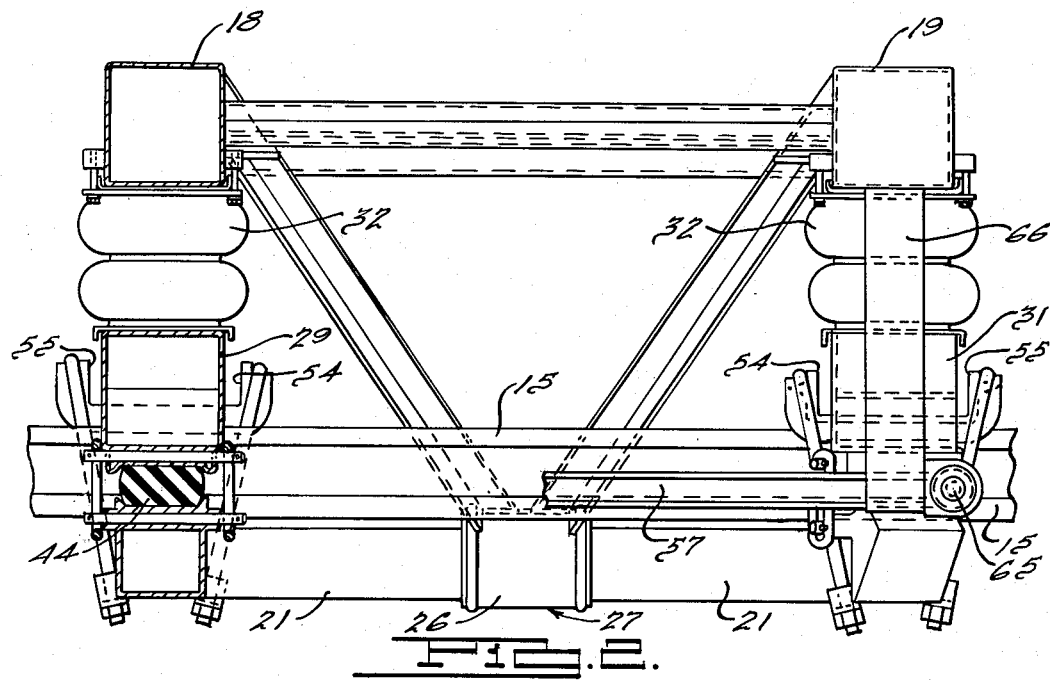
Figure 2 is a rear elevational view of the suspension taken along the line 2—2 of Figure 3, and showing the main frame, equalizing bars and torque arms as well as the rear radius rod.

Means are provided to limit this swinging movement of axles 14 and 15 about supports 24 and 27, and this means may comprise vertical stop portions 54 and 55 on the inner and outer ends of each adapter 33 and each adapter 35. As will be seen in Fig. 2, these stop portions are disposed in spaced relation with the side surfaces of equalizing beams 29 and 31, which are of course connected with the frame side members 18 and 19 respectively. Continued movement of either axle to the left or right as shown in Fig. 2 will therefore cause engagement of the stop portions 54 and 55 with the equalizing beams.

Means are also provided for restricting the relative lateral movement between the equalizing beams and the frame side members, and this means includes a forward radius rod 56 and a rear radius rod 57 secured to the forward and rear ends respectively of equalizing beam 29. As stated previously, equalizing beam 29 is somewhat longer than equalizing beam 31, and is provided at its forward end with a pair of downwardly extending ears 58 which support a pivot pin 59, one end of radius rod 56 being secured to pin 59. A downwardly extending bracket 61 is secured to frame side member 19, and the opposite end of radius rod 56 is pivotally secured at 62 to the lower end of this pedestal. Likewise, the rear end or equalizing beam 29 has a pair of downwardly extending ears 63 carrying pivot pin 64, one end of radius rod 57 being supported by pin 64. The opposite end of radius rod 57 is pivotally connected at 65 to the lower end of a bracket 66 extending downwardly from frame side member 18. It will therefore be seen that radius rods 56 and 57 serve to restrict lateral motion of equalizing beam 29 with respect to the trailer frame, and since this beam is connected to the other parts of the suspension by the above described arrangement of elements, equalizing beam 31 will likewise be restricted in its movement in a lateral direction.

The operation of the novel wheel suspension means may perhaps be best understood with reference to Figs. 5 and 6, Fig. 5 illustrating various positions of the pillow blocks 41 and 46 during operation, while Fig. 6 shows schematically how road axles 14 and 15 may adjust themselves relative to the trailer axis during turning movement of the vehicle. It should be pointed out that due to the steering geometry of the trailer, especially of a semi-trailer having a fifth wheel support at its forward end, the orbital paths of the forward wheels 16 and rear wheels 17 of the tandem assembly normally tend to assume a common center of rotation. This center is indicated at 67 in Fig. 6, which is an exaggerated diagrammatic view, the forward axle 14 of the tandem set tending to align itself on a radius 68 and the rear axle 15 on a radius 69. It will be observed that these radii are inclined from the normal with respect to the longitudinal axis 71 of the trailer. If the axles 14 and 15 are prevented from assuming such positions because of the nature of their suspension, turning movement of the vehicle will result in a scuffing or side-slipping of road axles 16 and 17, thus producing substantial tire wear.

The suspension means of the present invention eliminates this problem, since the axles 14 and 15 are suspended in such a manner that they may move from their normal position to the positions shown in Fig. 6. This action results from the fact that axles 14 and 15 are secured to torque arms 20 and 21 respectively, and these torque arms are in turn secured to the trailer chassis by resilient means which permits limited swinging movement. As described previously, the forward ends of torque arms 20 and 21 are secured to the trailer chassis by means of resilient supports 24 and 27 respectively, and the resilient nature of these supports permits swinging movement of the torque arms about vertical axes passing through the supports. The rear ends of the torque arms are connected to the trailer chassis through pillow blocks 41 and 46, and swinging movement of the rear ends of the torque arms will result in distortion of the pillow blocks and the creation of shearing forces therein. Thus, the axles 14 and 15 carried by the torque arms can swing out of their normal alignment in either direction, and will again assume their normal position when the trailer has completed its turn.

It will be noted that the action of the radius rods 56 and 57 in no way interferes with this swinging movement of the axles, since the radius rods are connected between the equalizing beam 29 and the frame side member 19. It should also be noted that due to the inclined position of the rectangular pillow blocks 41 and 46, the distortion of the pillow blocks will be evenly distributed throughout their mass. An examination of Fig. 2 will reveal that this inclined position is preferably such that one axis of each rectangular pillow block 41 passes substantially through support 24, which serves as the center of swinging movement of torque arms 20, while one axis of each pillow block 46 passes through support 27.

The novel suspension means also serves to absorb road shocks and jars and to distribute the momentary forces due to these road shocks between the two axles 14 and 15, thereby reducing the maximum loads which occur on any particular element of the assembly. This action is due to the presence of resilient supports 24 and 27, and also to the angular movement in a vertical direction of equalizing beams 29 and 31 which occurs when one or the other of the road axles, or one end of such axle, is subjected to a sudden vertical force. Fig. 5 illustrates the relative positions of the equalizing beam 29, torque arms 20 and 21 and pillow blocks 41 and 46 in various vertical positions of the axles. In studying this figure, it should be kept in mind that the positions shown are applicable to equalizing beam 31 as well as beam 29, and to either torque arm 20 and either torque arm 21. This is because the torque arms in each pair are allowed independent pivoting movement about the longitudinal axes of supports 24 and 27, as described above.

It will be seen from Fig. 5 that when for example axle 14 is moved upwardly, the pillow block 41 will assume a distorted shape due to the relative angular movements of torque arm 20 and the equalizing beam. This distortion of the pillow block and the resulting shearing stresses therein will serve a snubbing or shock absorbing function, and the pillow block will be retained in position by the beads or flanges on their upper and lower supports. Moreover, the resulting angular movement of the equalizing beam will result in a distortion of pillow block 46, and this distortion will be such as to transmit a part of the load to axle 15 and its associated parts. The sudden additional load will thus be distributed between the front and rear portions of the tandem assembly, thereby minimizing the load on each part. Likewise, when rear axle 15 encounters a sudden upward load, the equalizing beams will act in a similar manner to distribute part of the load to axle 14.

It should also be observed that resilient supports 24 and 27 will function upon upward or downward movement of the axles in a shock absorbing manner. The bellows-type springs 32 will serve to absorb vertical movements of the equalizing beams, thus minimizing the transmittal of road shock forces to the chassis frame. The resilient elements described also function to absorb road shocks in a lateral direction, for example when a side of a wheel strikes an object in its path.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In combination with a vehicle chassis and tandem axles, a suspension including a torque arm below and secured to each of said axles, means for securing one end of each torque arm to said vehicle chassis, said last-mentioned securing means permitting limited movement of said torque arm about a vertical axis, a beam spaced above said axles and extending therebetween, resilient means between said beam and said vehicle chassis, whereby the beam is permitted angular movement with respect to both said chassis and said axles in a vertical direction, a cushioning member held by the other end of each of said torque arms, said beam being supported at spaced points by said cushioning members, the cushioning members being so shaped as to permit independent limited lateral movement of said axles under and relative to said beam, and means carried by said beam for at least partially supporting said vehicle chassis.

2. In combination with a vehicle chassis and tandem road axles, a pair of torque arms below and secured to each of said axles at spaced points therealong and converging on one side of said axle, means for resiliently connecting the converging ends of said torque arms with said chassis, cushioning members held by the opposite ends of said torque arms, a pair of equalizing beams extending between said axles disposed thereabove and spaced therefrom so as to permit said axles to move freely laterally thereunder within limits permitted by said torque arms and said cushioning members, each beam being supported by the cushioning members on one side of said vehicle chassis, radius rods connecting at least one of said beams to the chassis for preventing said beams from moving laterally relative to the chassis, and resilient means for at least partially supporting said vehicle chassis on said equalizing beams.

3. The combination according to claim 2 wherein said cushioning members and said resilient connecting means mutually co-operate to permit relative lateral movement between said equalizing beams and said torque arms, whereby said axles are movable from their normal position transverse to the vehicle axis.

4. The combination according to claim 2, the resilient means between said equalizing beams and said chassis comprising a pair of bellows type air springs.

5. The combination according to claim 2, said supports for the converging ends of said torque arms including means for supporting the torque arms of each pair for independent pivotal movement about a horizontal axis.

6. In combination with a vehicle chassis and tandem road axles, a pair of torque arms secured to each of said axles at spaced points therealong, said torque arms converging on one side of said axle, a support secured to said chassis and depending therebelow adjacent said converging ends, inner and outer horizontal sleeves secured between said support and said converging ends, a resilient bushing disposed between said sleeves, whereby said torque arm ends are movable about vertical and horizontal axes, cushioning members held by the opposite ends of said torque arms, a pair of equalizing beams in parallel relation and spaced above said axles, each beam being supported by the cushioning members disposed on one side of said vehicle chassis, means for limiting the separating movement of said equalizing beams and said opposite torque arm ends in a vertical direction, the shape of said cushioning members being such as to permit limited lateral movement between said torque arms and said equalizing beams with subsequent shearing stresses in said cushioning members, means for restricting the relative lateral movement between one of said equalizing beams and said vehicle chassis, and yieldable means above each of said equalizing beams for partially supporting the vehicle chassis thereon.

7. In combination with a vehicle chassis and tandem road axles, a pair of torque arms secured to each of said axles at spaced points therealong and converging on one side of said axle, means for resiliently connecting the converging ends of said torque arms with said chassis, cushioning members held by the opposite ends of said torque arms, a pair of equalizing beams extending between said axles and spaced thereabove, each of said beams supported by the cushioning members on one side of said vehicle chassis, said cushioning members permitting relative lateral movement between said equalizing beams and said torque arms whereby said axles are movable from their normal position transversely to the vehicle axis, stop means for limiting the relative lateral movement between said axles and said equalizing beams in either direction, and resilient means for at least partially supporting said vehicle chassis on said equalizing beams.

8. In combination with a vehicle chassis and tandem road axles, a pair of torque arms secured to each of said axles at spaced points therealong and converging on one side of said axle, means for resiliently connecting the converging ends of said torque arms with said chassis, blocks of resilient material on the opposite ends of said torque arms, a pair of equalizing beams extending between said axles and spaced thereabove, each beam being supported by the blocks on one side of said vehicle chassis, recesses formed on said torque arms and said equalizing beams for retaining the upper and lower portions of said blocks, said blocks permitting relative lateral movement between said equalizing beams and said torque arms whereby said axles are movable from their normal position transversely to the vehicle axis, and resilient means for at least partially supporting said vehicle chassis on said equalizing beams.

9. In combination with a vehicle chassis and tandem road axles, a pair of torque arms secured to each of said axles at spaced points therealong and converging on one side of said axle, means for resiliently connecting the converging ends of said torque arms with said chassis, blocks of resilient material on the opposite ends of said torque arms, a pair of equalizing beams extending between said axles and spaced therabove, each beam being supported by the blocks on one side of said vehicle chassis, recesses formed on said torque arms and said equalizing beams for retaining the upper and lower portions of said blocks, said recesses and blocks being of rectangular shape with one axis passing substantially through said chassis-connected torque arm supports, said blocks permitting relative lateral movement between said equalizing beams and said torque arms whereby said axles are movable from their normal position transversely to the vehicle axis, and resilient means for at least partially supporting said vehicle chassis on said equalizing beams.

10. In a trailer having a body including a chassis and equipped with tandem axles provided with ground-engaging wheels, means for supporting the sprung weight of the trailer on said axles with the chassis disposed essentially low with respect to said ground-engaging wheels to permit the use of a body of maximum capacity, to provide a cushioned support for the body and at the same time permit said tandem axles to align themselves during turning of the trailer independently along respective turning radii comprising the combination of generally longitudinal torque arms below and connected intermediate the ends thereof to each of said axles, universal mountings connecting the forward ends of said torque arms to the chassis permitting said axles to move laterally under said chassis, resilient members on the rearward ends of said torque arms, longitudinal equalizing beams overlying said axles and extending between said torque arms resting upon and supported free and clear of said axles by said resilient members, means connecting at least one of said beams to the chassis to prevent lateral movement thereof relative to said chassis, and spring means between said chassis and said equalizing beams for cushioning the sprung weight of the trailer thereon.

11. In a trailer having a body including a chassis and equipped with tandem axles provided with ground-engaging wheels, means for supporting the sprung weight of the trailer on said axles with the chassis disposed essentially low with respect to said wheels to permit the use of a body of maximum capacity, to provide a cushioned support for the body and at the same time permit said tandem axles to align themselves during turning of the trailer independently along respective turning radii comprising the combination of generally longitudinal torque arms below and fastened intermediate the ends thereof to each of said axles, universal mountings fastening the forward ends of said torque arms to the chassis permitting said axles to move laterally under and relative to said chassis, blocks of elastomeric material on the rearward ends of said torque arms, longitudinal equalizing beams overlying said axles and extending between said torque arms resting upon and supported free and clear of the axles by said blocks, radius rods connecting at least one of said equalizing beams to said chassis to prevent lateral displacement thereof relative to said chassis, spring means between said chassis and said equalizing beams for supporting and cushioning the sprung weight of the trailer on said beams, and means connecting said blocks to said equalizing beams and said torque arms so that said lateral movement of the axles is accomplished only by distorting the material of said blocks.

12. In a trailer having a body provided with a chassis and equipped with tandem axles provided with ground-engaging wheels, means for supporting the sprung weight of the trailer on said axles with the chassis disposed essentially low with respect to said wheels to permit the use of a body of maximum capacity, to provide a cushioned support for the body and at the same time permit said tandem axles to align themselves during turning of the trailer independently along respective turning radii comprising the combination of generally longitudinal torque arms below and fastened intermediate the ends thereof to each of said axles, universal mountings fastening the forward ends of said torque arms to the chassis permitting said axles to move laterally under and relative to said chassis, blocks of elastomeric material on the rearward ends of said torque arms, longitudinal equalizing beams overlying said axles and extending between said torque arms resting upon and supported free and clear of the axles by said blocks, means for preventing lateral displacement of the beams relative to said chassis, means connecting said blocks to said equalizing beams and said torque arms so that said lateral movement of the axles is accomplished only by distorting the material of said blocks, means co-operating between said axles and said equalizing beams for limiting the amount of lateral movement of said axles and for preventing overstressing of said blocks, and spring means between said chassis and said equalizing beams for supporting and cushioning the sprung weight of the trailer on said beams.

13. In a trailer having a body including a chassis and equipped with tandem axles provided with ground-engaging wheels, means for supporting the sprung weight of the trailer on said axles with the chassis disposed essentially low with respect to said wheels to permit the use of a body of maximum capacity, to provide a cushioned support for the body and at the same time permit said tandem axles to align themselves during turning of the trailer independently along respective turning radii comprising the combination of generally longitudinal torque arms below and fastened intermediate the ends thereof to each of said axles, universal mountings fastening the forward ends of said torque arms to the chassis permitting said axles to move laterally under and relative to said chassis, blocks of elastomeric material on the rearward ends of said torque arms, longitudinal equalizing beams overlying said axles and extending between said torque arms resting upon and supported free and clear of the axles by said blocks, radius rods connecting said equalizing beams to said chassis to prevent lateral displacement of the beams relative to said chassis, means connecting said blocks to said equalizing beams and said torque arms so that said lateral movement of the axles is accomplished only by distorting the material of said blocks, adapters fastened securely to said axles having upwardly extending arms disposed in embracing relation to said equalizing beams, said adapter arms being engageable by said beams upon lateral movement of said axles in either direction and cooperating therewith to limit the extent of lateral movement afforded said axles and to prevent overstressing of said blocks of resilient material, and spring means between said chassis and said equalizing beams for supporting and cushioning the sprung weight of the trailer on said beams.

14. In a trailer having a body including a chassis and equipped with tandem axles provided with ground-engaging wheels, means for supporting the sprung weight of the trailer on said axles with the chassis disposed essentially low with respect to said wheels to permit the use of a body of maximum capacity, to provide a cushioned support for the body and at the same time permit said tandem axles to align themselves during turning of the trailer independently along respective turning radii comprising the combination of a pair of forwardly converging torque arms below and fastened intermediate the ends thereof to each of said axles, universal mountings fastening the converging forward ends of said pairs of torque arms to said chassis, resilient members on the rearward ends of said torque arms, longitudinal equalizing beams overlying said axles and extending between said torque arms resting upon and supported free and clear of said axles by said resilient members, means for preventing relative lateral movement between said equalizing beams and said chassis and rubber air springs between said chassis and said equalizing beams for cushioning the sprung weight of the vehicle.

References Cited in the file of this patent

UNITED STATES PATENTS

| | | |
|---|---|---|
| 1,928,860 | Marcum | Oct. 3, 1933 |
| 1,949,830 | Fageol | Mar. 6, 1934 |
| 2,417,690 | Keller | Mar. 18, 1947 |
| 2,493,024 | Pointer | Jan. 3, 1950 |

FOREIGN PATENTS

| | | |
|---|---|---|
| 660,794 | Germany | June 2, 1938 |
| 1,009,064 | France | Feb. 27, 1952 |